(12) United States Patent
Ohkawa

(10) Patent No.: US 6,668,664 B1
(45) Date of Patent: Dec. 30, 2003

(54) ULTRASONIC FLOWMETER AND MANUFACTURING METHOD THEREOF

(75) Inventor: Michio Ohkawa, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 8 days.

(21) Appl. No.: 09/624,451

(22) Filed: Jul. 24, 2000

(30) Foreign Application Priority Data

Jul. 27, 1999 (JP) .......................................... 11-212940

(51) Int. Cl.7 ................................................. G01F 1/66
(52) U.S. Cl. .................................................. 73/861.27
(58) Field of Search ........................ 73/861.27, 861.26, 73/861.28, 861.29, 861.31, 861.18, 720, 726, 727

(56) References Cited

U.S. PATENT DOCUMENTS 4,375,767 A * 3/1983 Magori ..................... 73/861.18
4,454,767 A * 6/1984 Shinkai et al. ........... 73/861.18
5,597,962 A * 1/1997 Hastings et al. ......... 73/861.28
6,260,418 B1 * 7/2001 Ishihara et al. ............... 73/756

FOREIGN PATENT DOCUMENTS

| JP | 54-67981 | 10/1952 |
| JP | 56-133625 | 10/1981 |
| JP | 10-122923 | 5/1998 |

* cited by examiner

Primary Examiner—Edward Lefkowitz
Assistant Examiner—Corey D. Mack
(74) Attorney, Agent, or Firm—Kolisch Hartwell, P.C.

(57) ABSTRACT

An ultrasonic flowmeter of the present invention has a pipe (2) through which a fluid to be measured flows, and measurement portions (3) separated on the pipe by a predetermined distance along the longitudinal direction of the pipe. The measurement portions each comprises a transducer fixing member (4) having an arc shaped indentation (6) into which a part of the pipe can be fitted, and a piezoelectric transducer (5) fixed to the transducer fixing member. The pipe and the arc shaped indentation are closely fixed to each other by an adhesive (7) by fitting and pressing the pipe into the arc shaped indentation via the adhesive.

2 Claims, 7 Drawing Sheets

ULTRASONIC FLOWMETER AND MANUFACTURING METHOD THEREOF

BACKGROUND OF THE INVENTION

1. Field of the Invention

The present invention relates to an ultrasonic flowmeter and a manufacturing method thereof. This application is based on Japanese Patent Application No. Hei 11-212940, and the contents of which are incorporated herein by reference.

2. Description of the Related Art

Recently, ultrasonic flowmeters have been used to measure the flow rates of fluids.

Each of these ultrasonic flowmeters has two piezoelectric transducers which are separated by a predetermined distance along the longitudinal direction of the pipe in which the fluid flows. In this ultrasonic flowmeter, ultrasonic waves are reciprocally transmitted between these two piezoelectric transducers and the flow velocity of the fluid in the pipe is measured by the difference between the transmission times of the reciprocal transmissions, and the flow rate is determined from the flow velocity.

In this ultrasonic flowmeter, the piezoelectric transducers are ring shaped and are fixed to the pipe, which is inserted through the piezoelectric transducers, by adhesives. However, in this structure, spaces are formed between the inner surfaces of the piezoelectric transducers and the outer surface of the pipe by bubbles in the adhesives and the like. Therefore, the transmission of ultrasonic waves between the piezoelectric transducers and the fluid flow in the pipe is insufficient, and problems may arise in that the flow rate cannot be exactly measured.

Furthermore, the piezoelectric transducers can be fixed to rings which are already fixed to the pipe. However, in this case, spaces can also be formed between the rings and pipe, similarly to the above-described case, and this can also give rise to problems in the measurement of the flow rate.

The present invention is provided in view of the above-described situation, and the purpose of the present invention is to provide an ultrasonic flowmeter which can measure the flow rate exactly and a manufacturing method thereof.

SUMMARY OF THE INVENTION

The present invention, to achieve the above objective, provides an ultrasonic flowmeter having a pipe through which a fluid to be measured flows, and measurement portions separated on the pipe by a predetermined distance along the longitudinal direction of the pipe; and which determines a flow rate of the fluid from a flow velocity which is determined from a difference in transmission times for reciprocal transmissions of ultrasonic waves between the measurement portions; and is characterized in that the measurement portions each comprise a transducer fixing member having an arc shaped indentation into which a part of the pipe can be fitted, and a piezoelectric transducer fixed to the transducer fixing member; and the pipe and the arc shaped indentation are closely fixed to each other by an adhesive.

The present invention also provides an ultrasonic flowmeter having a pipe through which a fluid to be measured flows, and measurement portions separated on the pipe by a predetermined distance along the longitudinal direction of the pipe; and which determines a flow rate of the fluid from a flow velocity which is determined from a difference in transmission times for reciprocal transmissions of ultrasonic waves between the measurement portions; and is characterized in that the measurement portions each comprise a piezoelectric transducer closely fixed by an adhesive to a part of the pipe, so as to have an arc shape along the circumference of the pipe.

The present invention also provides an ultrasonic flowmeter having a pipe through which a fluid to be measured flows, and measurement portions separated on the pipe by a predetermined distance along the longitudinal direction of the pipe; and which determines a flow rate of the fluid from a flow velocity which is determined from a difference in transmission times for reciprocal transmissions of ultrasonic waves between the measurement portions; and is characterized in that the measurement portions each comprise a piezoelectric transducer closely fixed on a part of the pipe so as to have an arc shape along a circumference of the pipe, and a tube covering an outer surface of the pipe at a position of the piezoelectric transducer is provided and closely fixing the piezoelectric transducer to the pipe by pressing the piezoelectric transducer against the pipe.

The present invention also provides a manufacturing method of an ultrasonic flowmeter having a pipe through which a fluid to be measured flows, and having measurement portions separated on the pipe by a predetermined distance along the longitudinal direction of the pipe; and which determines a flow rate of the fluid from a flow velocity which is determined from a difference in transmission times for reciprocal transmissions of ultrasonic wave between the measurement portions; and is characterized in that the measurement portions each comprise a transducer fixing member having an arc shaped indentation into which a part of the pipe can be fitted, and a piezoelectric transducer fixed to the transducer fixing member; and having a step of closely fixing the transducer fixing member to the pipe by an adhesive by fitting and pressing the pipe on the arc shaped indentation via the adhesive.

The present invention also provides a manufacturing method of an ultrasonic flowmeter having a pipe through which a fluid to be measured flows, and having measurement portions separated on the pipe by a predetermined distance along the longitudinal direction of the pipe; and which determines a flow rate of the fluid from a flow velocity which is determined from a difference in transmission times for reciprocal transmissions of ultrasonic waves between the measurement portions; and is characterized in having steps of providing piezoelectric transducers which compose the measurement portions on an outer surface of the pipe along the circumference of the pipe via adhesives, and closely fixing the pipe by adhesives by fitting and pressing the pipe on arc shaped indentations which are formed on transducer fixing members via the piezoelectric transducers.

The present invention also provides a manufacturing method of an ultrasonic flowmeter having a pipe through which a fluid to be measured flows, and having measurement portions separated on the pipe by a predetermined distance along the longitudinal direction of the pipe; and which determines a flow rate of the fluid from a flow velocity which is determined from a difference in transmission times for reciprocal transmissions of ultrasonic waves between the measurement portions; and is characterized in having steps of providing piezoelectric transducers which compose the measurement portions on an outer surface of the pipe along the circumference of the pipe, providing covering tubes on an outer surface of the pipe at positions of the piezoelectric transducers, and closely fixing the piezoelectric transducers to the pipe by pressing the piezoelectric transducers against the outer surface of the pipe along the circumference of the pipe using the tubes.

DESCRIPTION OF THE PREFERRED EMBODIMENTS

The preferred embodiments of the ultrasonic flowmeter of the present invention and the manufacturing method thereof will be explained as follows with reference to the Figures.

Figure 1:
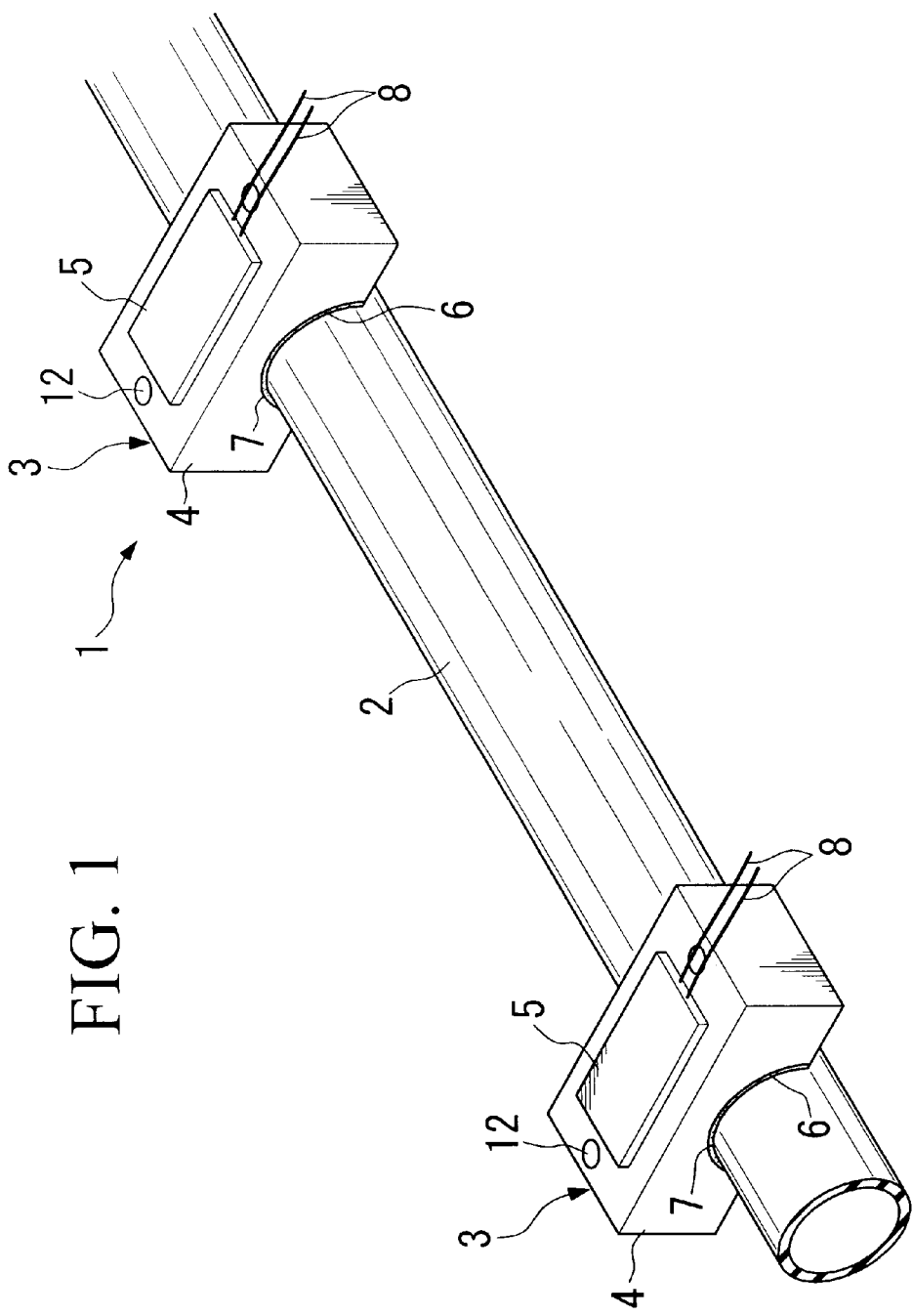
FIG. 1 is a perspective view of the ultrasonic flowmeter which shows a structure of an embodiment of the ultrasonic flowmeter of the present invention.

In FIG. 1, reference number 1 shows the ultrasonic flowmeter. This ultrasonic flowmeter has a pipe 2 through which a fluid to be measured flows and is formed by a synthetic resin such as vinyl chloride, for example, and two measurement portions 3 separated by a predetermined distance along the longitudinal direction of the pipe 2.

Figure 2:
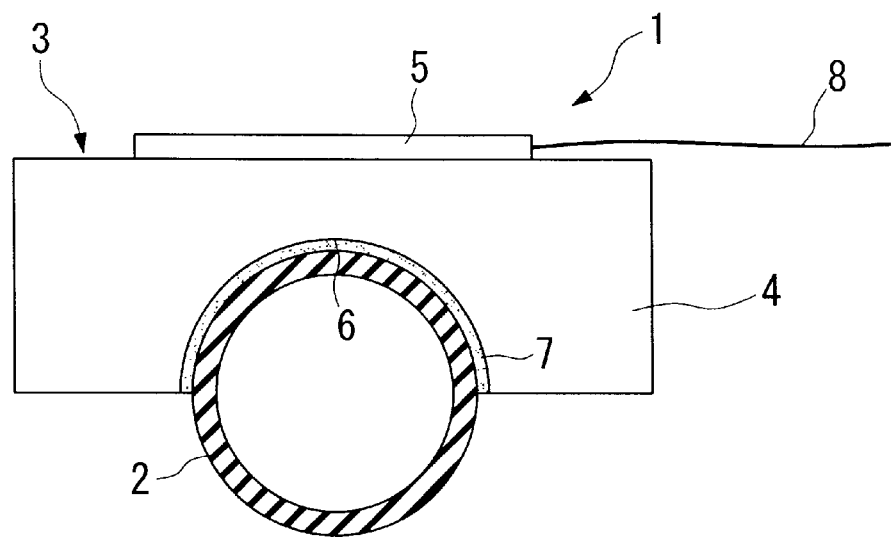
FIG. 2 is a cross sectional view of the ultrasonic flowmeter which shows a structure of an embodiment of the ultrasonic flowmeter of the present invention.

The each measurement portion 3 comprises a transducer fixing member 4 fixed to the outer surface of the pipe 2 and a piezoelectric transducer 5 fixed to the transducer fixing member 4, as shown in FIG. 2.

The transducer fixing member 4 is made of a metal which has a high transmittance of the ultrasonic waves, and an arc shaped indentation 6 is formed at a portion at which it is fixed to the pipe 2. A part of the outer surface of the pipe 2 is fitted into the arc shaped indentation 6, and the transducer fixing member 4 is strongly and closely fixed to the pipe 2 by an adhesive 7 in this fitting portion. Here, an epoxy type adhesive is used as the adhesive 7, for example.

Furthermore, as described above, the piezoelectric transducer 5 is fixed to the transducer fixing member 4 fixed to the pipe 2 by adhesion. Here, an epoxy type adhesive is also suitably used as the adhesive 7. In addition, reference number 8 is a lead wire of the piezoelectric transducer 5.

Figure 3:
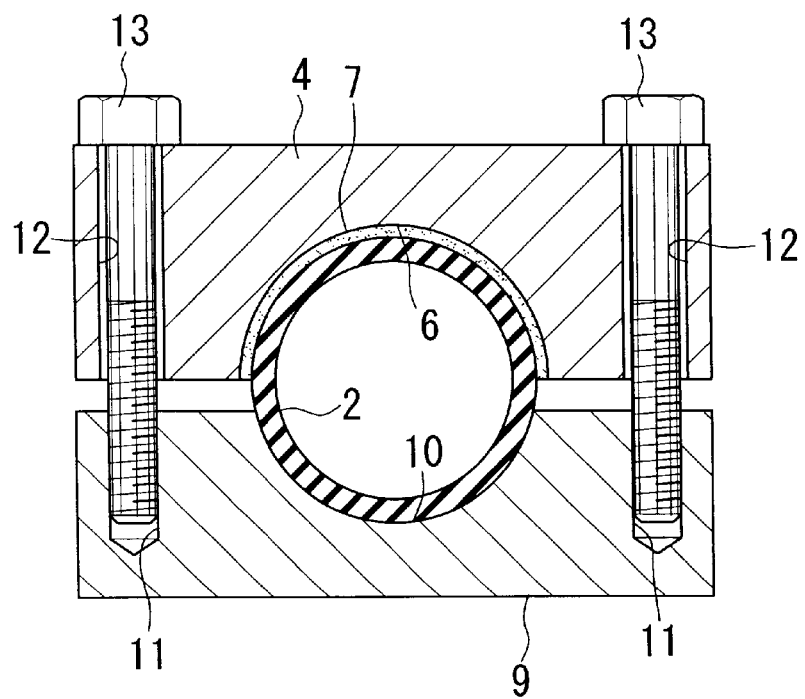
FIG. 3 is a cross sectional view of the ultrasonic flowmeter which explains the manufacturing method of an embodiment of the ultrasonic flowmeter of the present invention.

When manufacturing the above-described ultrasonic flowmeter, first, the arc shaped indentation 6 of each transducer fixing member 4 is fitted to a part of the outer surface of the pipe 2 via the adhesive 7. In this situation, a fixing jig 9 is placed so as to face the transducer fixing member 4 across the pipe 2, as shown in FIG. 3.

This fixing jig 9 has an arc shaped indentation 10 for fitting a part of the outer surface of the pipe 2, similar to the transducer fixing member. Furthermore, a pair of female screw holes 11 are bored at the fixing member 4 side.

Following the placing of the fixing jig 9 opposite to the transducer fixing member 4 for fitting the arc shaped indentation 10 of the fixing jig 9 to the outer surface of the pipe 2, screws 13 are inserted into a pair of insertion holes 12 which penetrate the transducer fixing member 4, and the tip portions of the screws 13 are engaged with the female screw holes 11.

Consequently, the transducer fixing member 4 and the fixing jig 9 are made to approach each other by the screw force of the screws 13, whereby the part of the outer surface of the pipe 2 which is fitted into the arc shaped indentation 6 of the transducer fixing member 4 is pressed against an inner surface of the arc shaped indentation 6 via the adhesive 7.

When the adhesive 7 has hardened, the screws 13 are unscrewed and the fixing jig 9 is removed, and after that, fixing the piezoelectric transducer 5 on the transducer fixing member 4 by the adhesive.

For measurement of the flow rate, a transmitter, a receiver, and a determination instrument which determines the flow rate by the data from the receiver, are connected to the lead wire 8 of each piezoelectric transducer 5.

As described above, in this ultrasonic flowmeter 1, the parts of the pipe 2 are closely fixed to the arc shaped indentations 6 of the transducer fixing members 4 in which the piezoelectric transducers 5 are fixed by adhesives 7, and the adhesion between the pipe 2 and the transducer fixing members 4 are improved. Consequently, the ultrasonic waves are properly transmitted between the piezoelectric transducers 5 and the fluid which flows in the pipe 2, and therefore, the flow rate can be exactly measured.

Furthermore, in the manufacturing method of this ultrasonic flowmeter 1, the transducer fixing members 4 are closely fixed to the pipe 2 by adhesives 7 by fitting and pressing the outer surface of the pipe 2 against the arc shaped indentations 6 of the transducer fixing members 4 via adhesives 7. Consequently, bubbles in the adhesive 7 are excluded and there is no generation of spaces by the bubbles, and therefore, the ultrasonic flowmeter 1 in which the transmission of the ultrasonic waves are properly transmitted between the piezoelectric transducers 5 and the fluid which flows in the pipe 2, can be manufactured.

Figure 4:
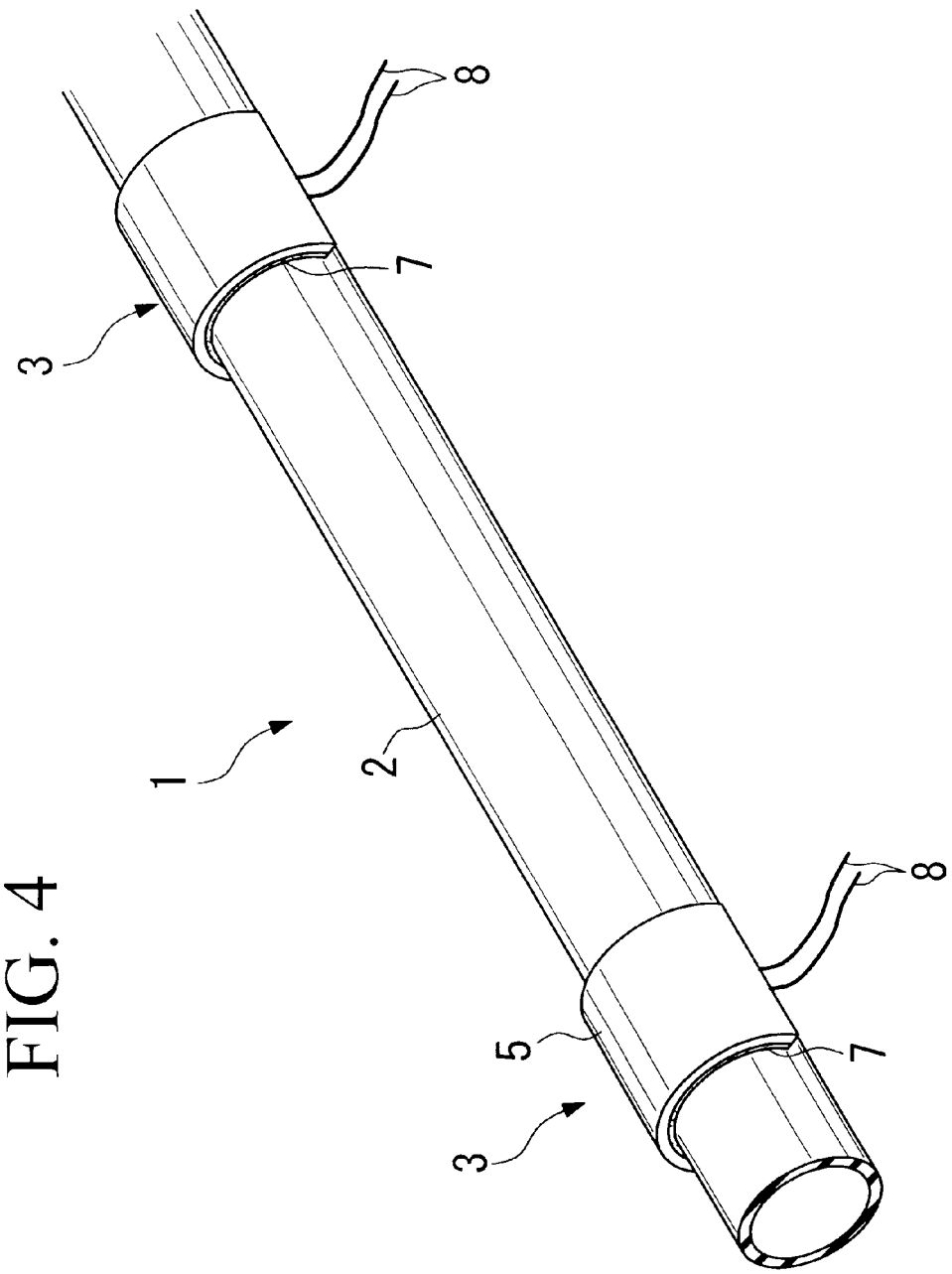
FIG. 4 is a perspective view of the ultrasonic flowmeter which shows a structure of another embodiment of the ultrasonic flowmeter of the present invention.
Figure 5:
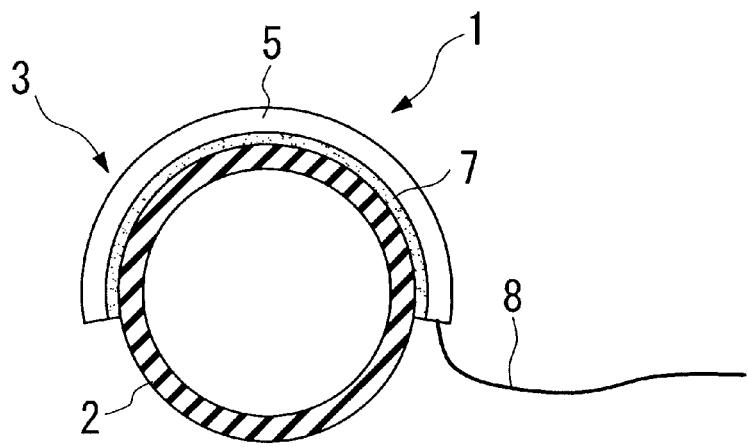
FIG. 5 is a cross sectional view of the ultrasonic flowmeter which shows a structure of another embodiment of the ultrasonic flowmeter of the present invention.

FIGS. 4 and 5 show an ultrasonic flowmeter 1 in which the piezoelectric transducers 5 are directly fixed to the pipe 2 by the adhesive 7.

Figure 6:
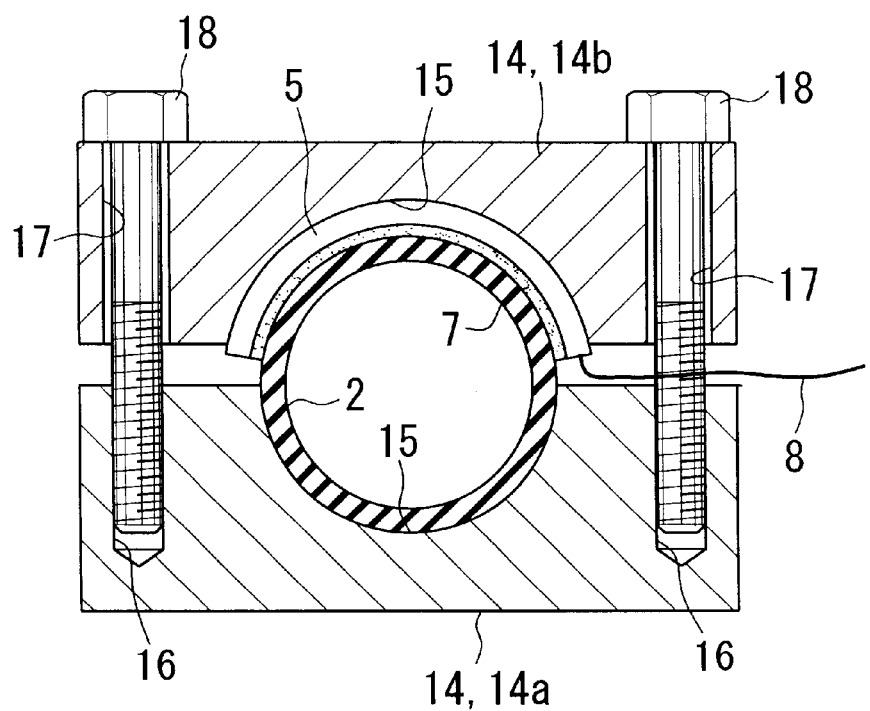
FIG. 6 is a cross sectional view of the ultrasonic flowmeter which explains the manufacturing method of another embodiment of the ultrasonic flowmeter of the present invention.

When manufacturing this ultrasonic flowmeter 1, the piezoelectric transducers 5 are placed on the outer surface of the pipe 2 along the circumferential direction, and after that, the locations where the piezoelectric transducers 5 are placed are clamped by a pair of fixing jigs 14 as shown in FIG. 6.

In these fixing jigs 14, arc shaped indentations 15 are formed at the opposing surfaces. The pipe 2 is directly fitted into the arc shaped indentation 15 of the first fixing jig 14a from one side, and is fitted into the arc shaped indentation 15 of the second fixing jig 14b via the piezoelectric transducer 5 from the other side. In addition, a pair of female screw holes 16 are bored on the first fixing jig 14a, and a pair of insertion holes 17 penetrate the second fixing jig 14b.

Furthermore, the fixing jigs 14 are made to approach each other by the screw force of the screws 18 inserted into the insertion holes 17 of the second fixing jig 14b and engaged the female screw holes 16 of the first fixing jig 14a, whereby, the pipe 2 is pressed against the piezoelectric transducer 5 which is placed into the inner surface of the arc shaped indentation 15 of the second fixing jig 14b via the adhesive 7.

When the adhesive 7 has hardened, the screws 18 are unscrewed and the fixing jigs 14 are removed, and the ultrasonic flowmeter 1 is completed.

As described above, in this ultrasonic flowmeter 1, the arc shaped piezoelectric transducers 5 are closely fixed to the parts of the outer surface of the pipe 2 by adhesives 7, and the adhesion between the pipe 2 and the piezoelectric transducers 5 is improved. Therefore, the ultrasonic waves are properly transmitted between the piezoelectric transducers 5 and the fluid which flows in the pipe 2, and the flow rate can be exactly measured.

Furthermore, in the manufacturing method of this ultrasonic flowmeter 1, the piezoelectric transducers 5 are closely fixed to the pipe 2 by adhesives 7 by fitting and pressing the pipe 2 against the arc shaped indentations 15 of the fixing jigs 14b via the piezoelectric transducers 5. Consequently, bubbles are excluded from adhesives 7 and there is no generation of spaces by the bubbles, and therefore, an ultrasonic flowmeter 1 in which the ultrasonic waves are properly transmitted between the piezoelectric transducers 5 and the fluid which flows in the pipe 2, can be produced.

Figure 7:
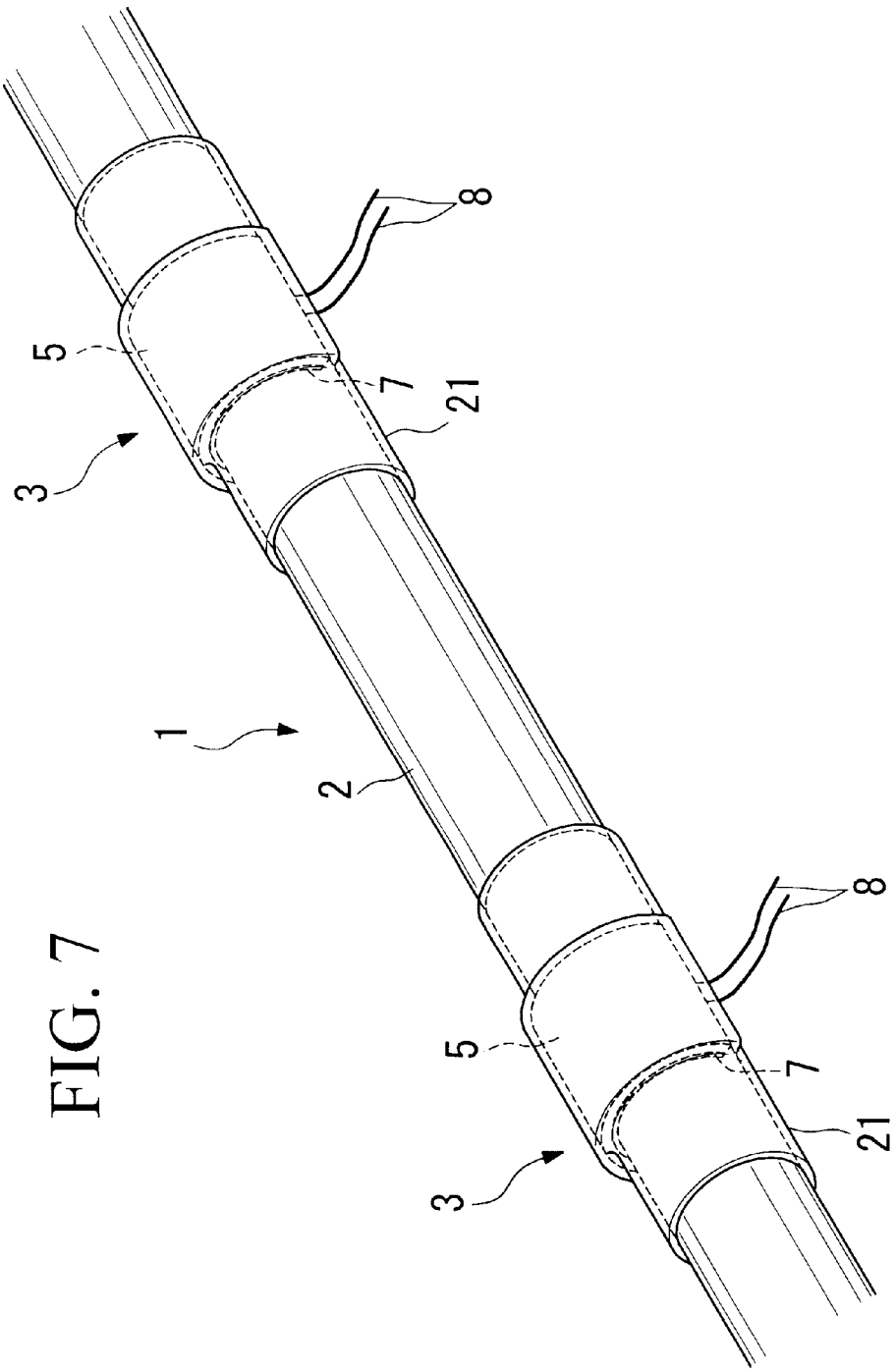
FIG. 7 is a perspective view of the ultrasonic flowmeter which shows a structure of another embodiment of the ultrasonic flowmeter of the present invention.
Figure 8:
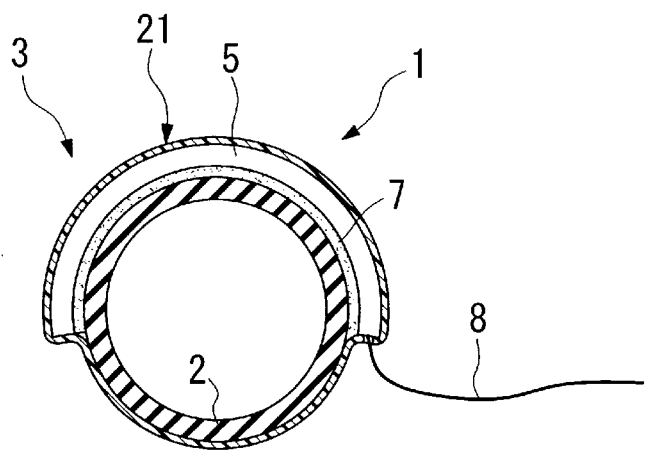
FIG. 8 is a cross sectional view of the ultrasonic flowmeter which shows a structure of another embodiment of the ultrasonic flowmeter of the present invention.

FIGS. 7 and 8 show an ultrasonic flowmeter 1 in which the piezoelectric transducers 5 are directly fixed to the pipe 2 by adhesives 7, and their circumferences are covered by tubes 21.

Figure 9:
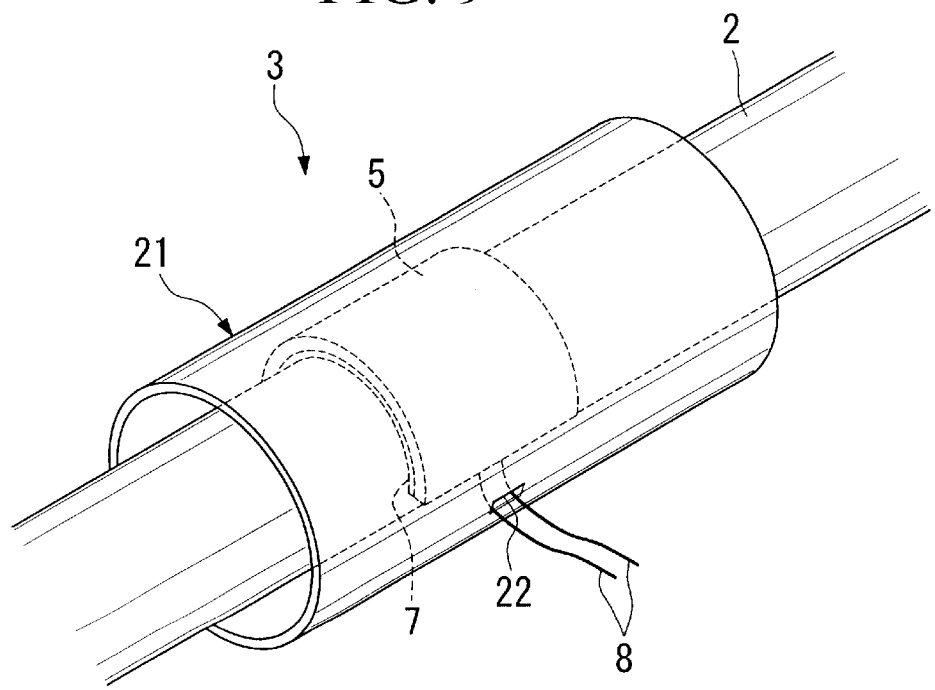
FIG. 9 is a perspective view of the ultrasonic flowmeter which explains the manufacturing method of another embodiment of the ultrasonic flowmeter of the present invention.
Figure 10:
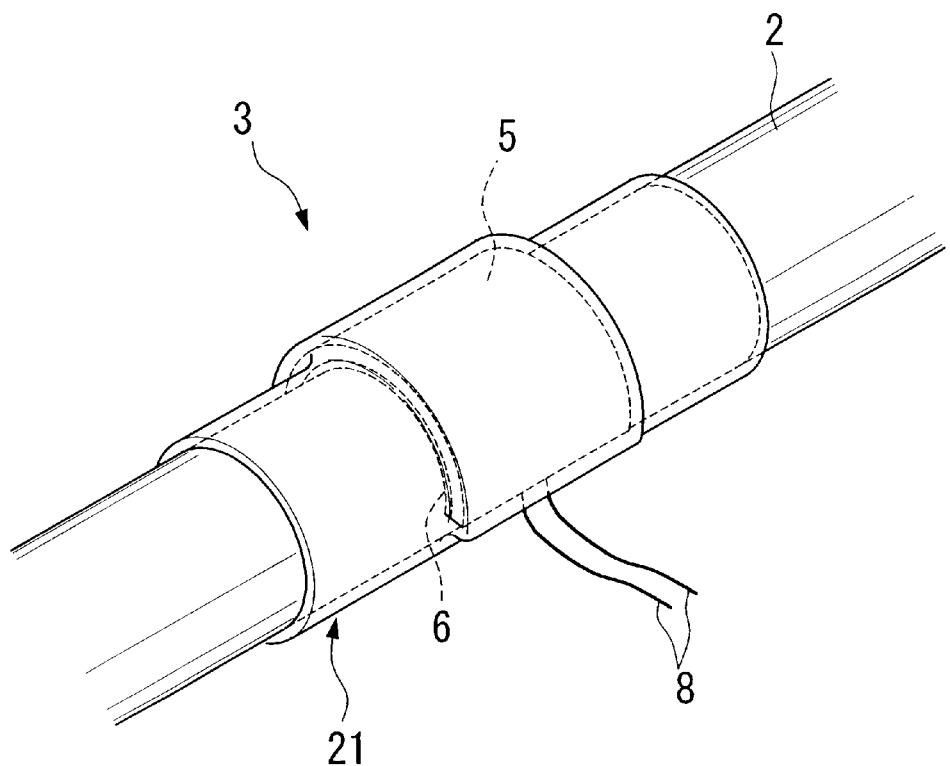
FIG. 10 is a perspective view of the ultrasonic flowmeter which explains the manufacturing method of another embodiment of the ultrasonic flowmeter of the present invention.

When manufacturing this ultrasonic flowmeter 1, each piezoelectric transducer 5 is placed on the outer surface of the pipe 2 along the circumferential direction via adhesives 7, and then, the tubes 21 which made of a heat contractile resin are installed so as to surround the place in which the piezoelectric transducer 5 is placed as shown in FIG. 9. The tube 21 is then heated in this state to cause heat contraction. Reference number 22 in FIG. 9 shows a hole bored through the tube 21 to allow the lead wires 8 of the piezoelectric transducer 5 to pass through.

As a result of the heating, the piezoelectric transducers 5 placed on the parts of the outer surface of the pipe 2 are pressed against the outer surface of the pipe 2 along the arc of the outer surface by the tubes 21 which cover the parts, and are contracted by the heat.

As described above, in this ultrasonic flowmeter 1, the piezoelectric transducers 5 are closely fixed to the parts of the outer surface of the pipe 2 by the tubes 21 which continuously press them over their outer circumference, and the strong adhesion between the pipe 2 and the piezoelectric transducers 5 is maintained. Therefore, the ultrasonic waves will be properly transmitted between the piezoelectric transducers 5 and the fluid which flows in the pipe 2 for a long time, and the flow rate can be exactly measured.

Furthermore, in the manufacturing method of this ultrasonic flowmeter 1, the piezoelectric transducers 5 placed on the outer surface of the pipe 2 are closely fixed to the outer surface by the heat contractile tubes 21 which cover and pressing the piezoelectric transducers 5 against the outer surface of the pipe 2 along the arc of the outer surface. Therefore, an ultrasonic flowmeter 1 in which the ultrasonic waves can be properly transmitted between the piezoelectric transducers 5 and the fluid which flows in the pipe 2, can be produced.

In addition, in the above-described embodiment, the tubes 21 are made of the heat contractile resin and press the piezoelectric transducers 5 to the pipe 2 by heat contraction, however, the material of the tubes 21 is not limited to heat contractile resin. For example, the tubes 21 can be made of an elastic material such as rubber. That is, the piezoelectric transducers 5 can be covered by tubes 21 made of rubber. In this case, the piezoelectric transducers 5 are pressed against the outer surface of the pipe 2 by the contraction caused by the elasticity of the tubes 21.

Furthermore, in the above-described embodiment, the piezoelectric transducers 5 are fixed to the pipe 2 by adhesives 7, however, the piezoelectric transducers 5 can be pressed and directly fixed to the pipe 2 only by the pressing force due to the contraction of the tubes 21.

What is claimed is:

1. An ultrasonic flowmeter having a pipe through which a fluid to be measured flows and measurement portions separated on said pipe by a predetermined distance along the longitudinal direction of said pipe; and which determines a flow rate of said fluid from a flow velocity which is determined from a distance in transmission times for reciprocal transmissions of ultrasonic waves between said measurement portions;

said measurement portions each comprise an arc-shaped piezoelectric transducer into which a part of said pipe can be fitted;

and said piezoelectric transducer is closely fixed to said pipe by being set and adhered on an outer surface of said pipe using adhesive and by pressing said piezoelectric transducer toward said pipe in order to exclude bubbles from said adhesive.

2. An ultrasonic flowmeter having a pipe through which a fluid to be measured flows, and measurement portions separated on said pipe by a predetermined distance along the longitudinal direction of said pipe; and which determines a flow rate of said fluid from a flow velocity which is determined from a difference in transmission times for reciprocal transmissions of ultrasonic waves between said measurement portions;

wherein said measurement portions each comprise an arc-shaped piezoelectric transducer into which a part of said pipe can be fitted and are provided on an outer surface of said pipe, and a covering tube which is made of a thermally contractive resin and surrounds an outer circumference of said pipe where said piezoelectric transducer is provided;

and wherein said piezoelectric transducer is closely fixed to said pipe by pressing said piezoelectric transducer against an outer surface of said pipe by means of thermal contraction of said covering tube along a radial direction thereof.

* * * * *